Patented Oct. 27, 1936

2,058,547

UNITED STATES PATENT OFFICE 2,058,547

PROCESS FOR CATALYTIC SYNTHESIS OF HETEROCYCLIC AMINES AND PRODUCTS PRODUCED THEREBY

Homer Adkins, Madison, Wis., and Howard I. Cramer, Cuyahoga Falls, Ohio

No Drawing. Application June 27, 1932, Serial No. 619,524

23 Claims. (Cl. 260—43)

This invention relates to the catalytic alkylation of the heterocyclic amines. More particularly, it relates to the liquid phase alkylation, in the presence of a contact catalyst, of the nitrogen-heterocyclic amines, among them piperidine, alpha and beta pipecoline, pyrrolidine, indoline, etc. Among other advantages characterizing the process of the invention are its simplicity, high degree of efficiency, and excellent yields of practically pure products.

Heretofore, it has been possible to prepare amines by reacting alcohol and ammonia in the vapor phase over an oxide catalyst, but such reactions have required hours for their completion, have given but low yields and have resulted in products seriously contaminated by undesired by-products. By the present invention, these disadvantages are eliminated and a simple, satisfactory process provided employing the liquid, rather than vapor, phase for bringing about the reaction.

The invention involves, among other things, the discovery that by reacting at a temperature between about 175° and about 250° C., in the liquid phase and in the presence of a reduced nickel catalyst, a hydroxy compound and a nitrogen heterocyclic compound containing replaceable hydrogen attached to the nuclear nitrogen atom, water is eliminated between the hydroxy compound and the heterocyclic compound and a tertiary heterocyclic compound is formed. Although the reactions may be carried out efficiently at any temperature between about 175° and about 250° C., it has been found that working at a temperature of around 200° C. is even more efficient. As a rule, little or no alkylation takes place below 100° C. Although not strictly necessary in the practice of the invention, it will generally be found preferable to carry out the reaction under superatmospheric conditions of pressure and with agitation of the materials such as is obtained in a shaking autoclave. Usually pressures in the neighborhood of 100 atmospheres will be found highly efficient. It has been found that ratios of amine to alcohol of the order of 1:2 give higher yields than equimolar ratios even though only molar ratios react.

In place of the nitrogen heterocyclic compound containing replaceable hydrogen attached to the hetero nitrogen atom, unsaturated parent ring compounds may be used with excellent results when the reaction is carried out in the presence of hydrogen under pressure. Thus in case a tertiary piperidine compound is to be prepared, in place of piperidine as a starting material, pyridine plus hydrogen may be used.

Although the invention is not limited thereto, a reduced nickel catalyst prepared according to the process outlined more fully in the patent application of Homer Adkins, Serial No. 616,093, filed June 8, 1932, has been found to be highly efficient in this type of reaction. The catalyst of that application is preferably prepared by grinding acid-washed kieselguhr having associated therewith, in approximately equal amount, a nickel salt dissolved in water, preferably nickel nitrate. After being ground to a cream-like consistency, a basic carbonate in water solution, preferably sodium bicarbonate, is added thereto. The resulting precipitated nickel carbonate is then reduced to elementary nickel by heating in the presence of hydrogen, methanol, ethanol, or other reducing gas for about an hour at a temperature of 425–475° C.

For the purposes of the present invention, the catalyst need not be prepared by the method outlined above. For example, one may use nickel prepared by (1) the reduction of any nickel salt, either supported or unsupported, by hydrogen or other reducing agents; (2) the treatment of a nickel alloy such as nickel-aluminum or nickel-silicate with aqueous alkalis; (3) the reduction of nickel salts in admixture with salts of other metals of group VIII or I of the periodic table acting as co-catalysts; or (4) the reduction of nickel salts mixed with promoters such as oxides of the metals of groups II, III, IV, V and VI of the periodic table. Still other methods of preparing a reduced nickel catalyst possessing catalytic activity for use in the present invention are (1) the mechanical subdivision of massive nickel; (2) the anodic oxidation of nickel surfaces followed by reduction; (3) the colloidal dispersion of metallic nickel and (4) the precipitation by more electropositive metals such as aluminum and zinc. Other contact catalysts may, of course, be used with excellent results, examples being those of copper and cobalt prepared in a similar manner.

Any nitrogen heterocyclic compound containing replaceable hydrogen attached to the nuclear nitrogen atom or any of the unsaturated parent ring compounds which, when treated with hydrogen, produce such a nitrogen heterocyclic compound containing replaceable hydrogen attached to the nitrogen atom, may be used in the invention. Examples of heterocyclic compounds containing replaceable hydrogen attached to the hetero nitrogen atom are piperidine, alpha and beta pipecoline, alpha ethyl piperidine and other alkyl piperidines, alpha benzyl piperidine, 2-phenyl ethyl piperidine, 4-phenyl ethyl piperidine, pyrrolidine, alpha methyl pyrrolidine, alpha piperidyl pyrrolidine, pyrazoline, pyrazolidine, indoline, tetra hydro carbazole, hexahydro carbazole and dihydro glyoxalines.

Still others are dihydro mu methyl benziminazole, alpha phenyl piperidine, dipiperidyls, lupetidines, copellidines, tetra hydro quinoline, decahydro quinoline, tetra hydro quinaldine, decahydro quinaldine and ms dihydro acridine. The parent ring compounds, well-known to chemists, are not specifically disclosed since their hydrogenated forms have been given above.

Any hydroxy compound, aliphatic, alicyclic, aryl, aralkyl, heterocyclic or heteroalkyl, may be employed. Examples are methanol, ethanol, propanol, butanol, alpha and beta naphthol, deca hydro naphthols, tetra hydro naphthols, methyl cyclohexanol, ethyl cyclohexanol, cyclo hexanol, benzyl alcohol, phenyl ethyl alcohol, furfuryl alcohol, the cresols, tetra hydro furfuryl alcohol, hydroxy pyridine and hydroxy piperidine. In general, the substantially neutral organic compounds containing an OH radical attached to carbon are applicable for the practice of the invention.

As illustrative of the invention, but not limitative thereof, the following examples are given:

Example 1

Approximately 0.5 mol. of piperidine was reacted with 1 mol. of ethanol under a pressure of approximately 100 atmospheres of nitrogen in the presence of about 2 grams of a reduced nickel catalyst prepared by the process outlined in application Serial No. 616,093, filed June 8, 1932, for 3½ hours at a temperature of 200 degrees C. The product, N-ethyl piperidine, boiling point 125–129 degrees C., was obtained in a yield of about 80% by fractional distillation.

Example 2

Alpha methyl piperidine and ethanol were reacted in a shaking autoclave in proportions of .5 mol. to 1 mol., respectively, for about 7 hours in the presence of 3 grams of the nickel catalyst referred to in Example 1, at a temperature of about 200 degrees C. and under a pressure of approximately 100 atmospheres of hydrogen. N-ethyl alpha methyl piperidine, boiling point 145–147 degrees C., was obtained in a yield of about 84%.

Example 3

0.5 mol. of alpha methyl piperidine and about 1 mol. of butanol-1 were reacted under a pressure of approximately 100 atmospheres of nitrogen in the presence of 3 grams of the reduced nickel catalyst employed in Examples 1 and 2 for 3½ hours at a temperature of about 200 degrees C. N-n-butyl alpha methyl piperidine, boiling point 185–190 degrees C., was obtained in a yield of about 78%.

Example 4

Piperidine and ethanol in proportions of about .5 mol. to 1 mol., respectively, were reacted under a pressure of approximately 100 atmospheres of hydrogen in the presence of 2 grams of the nickel catalyst used in Example 1 for 3½ hours at 200 degrees C. N-ethyl piperidine, boiling point 125–129 degrees C., was obtained in a yield of about 78%.

Example 5

0.45 mol. of piperidine and .5 mol. of butanol were reacted under a pressure of approximately 100 atmospheres of the hydrogen for 3½ hours in the presence of 3 grams of a reduced nickel catalyst similar to that used in Example 1 at 200 degrees C. A yield of 35% N-n-butyl piperidine, boiling point 167–172 degrees C., was obtained. The comparatively low yield was due to the smaller amount of alcohol employed. It has been noticed that, in general, ratios of about 1:2 of amine to alcohol, respectively, give higher yields.

Example 6

Piperidine and cyclohexanol in the ratio of 1 mol. to 2 mols., respectively, were reacted at 200 degrees C. under a pressure of approximately 100 atmospheres of hydrogen for about 470 minutes in the presence of 4 grams of the reduced nickel catalyst used in Example 1. The product, N-cyclo hexyl piperidine, boiling point 98 to 100 degrees C. at 100 mm. pressure, was obtained in a yield of 76%.

By this invention, a new process for preparing tertiary heterocyclic amines is thus provided wherein reactions may be carried out efficiently at low temperatures in comparison with the prior art processes. The reactions proceed practically to completion with almost no undesirable side reactions. Further, by the use of reduced nickel, a catalyst is provided which does not deteriorate as rapidly as the prior art catalysts. Still further, by working in the liquid phase the use of more compact, efficient and simplified apparatus is permitted and likewise a greater ease and accuracy in the manipulation of the starting materials and of the final products is attained.

Although only the preferred forms of the invention have been described in detail, it will be apparent to those skilled in the art that it is not so limited but that various minor modifications may be made therein, without departing from the spirit of the invention or from the scope of the appended claims. It is intended that the patent shall cover, by suitable expression in the appended claims, whatever features of patentable novelty reside in the invention.

What is claimed is:

1. A process of preparing tertiary heterocyclic amines which comprises reacting at a temperature between approximately 175° C. and approximately 250° C., under superatmospheric pressure, in the liquid phase and in the presence of a catalyst selected from the group consisting of copper, cobalt and nickel, a substantially neutral organic hydroxy compound in which the hydroxy radical is directly attached to a carbon atom and a heterocyclic compound containing only nitrogen as the heterocyclic atom, a replaceable hydrogen atom being attached to the hetero nitrogen atom.

2. A process of preparing tertiary heterocyclic amines which comprises reacting under superatmospheric pressure, at a temperature between approximately 175° and approximately 250° C., in the liquid phase and in the presence of a nickel catalyst, an aliphatic alcohol and a heterocyclic compound containing only nitrogen as the heterocyclic atom, a replaceable hydrogen atom being attached to a nuclear nitrogen atom.

3. A process of preparing tertiary heterocyclic amines which comprises reacting under superatmospheric pressure, at a temperature between approximately 175° and approximately 250° C., in the liquid phase and in the presence of a nickel catalyst, a hydrogenated hydroxy compound of the benzene and naphthalene series and a heterocyclic compound containing only nitrogen as the heterocyclic atom, a replaceable hydrogen atom being attached to a nuclear nitrogen atom.

4. A process of preparing N-cyclohexyl piperidine which comprises reacting at a temperature between approximately 175° and approximately 250° C., in the liquid phase and in the presence of a reduced nickel catalyst, cyclohexanol and piperidine.

5. A process of preparing tertiary heterocyclic amines which comprises reacting under superatmospheric pressure, at a temperature between approximately 175° and approximately 250° C., in the liquid phase and in the presence of a nickel catalyst, an aliphatic alcohol and an azine compound containing only nitrogen as the heterocyclic atom, a replaceable hydrogen atom being attached to a nuclear nitrogen atom.

6. A process of preparing tertiary heterocyclic amines which comprises reacting under superatmospheric pressure, at a temperature between approximately 175° and approximately 250° C., in the liquid phase and in the presence of a nickel catalyst, an aliphatic alcohol and a piperidyl compound containing replaceable hydrogen attached to the nuclear nitrogen atom.

7. A process of preparing tertiary heterocyclic amines which comprises reacting under superatmospheric pressure, at a temperature between approximately 175° and approximately 250° C., in the liquid phase and in the presence of a reduced nickel catalyst, an alicyclic alcohol and a piperidyl compound containing replaceable hydrogen attached to the nuclear nitrogen atom.

8. A process of preparing tertiary heterocyclic amines which comprises reacting at a temperature between approximately 175° and approximately 250° C., in the liquid phase and in the presence of a reduced nickel catalyst, an aliphatic alcohol containing not more than seven carbon atoms and a heterocyclic compound containing only nitrogen as the heterocyclic atom, a replaceable hydrogen atom being attached to a nuclear nitrogen atom.

9. A process of preparing tertiary heterocyclic amines which comprises reacting at a temperature between approximately 175° and approximately 250° C., in the liquid phase and in the presence of a nickel catalyst, an aliphatic alcohol containing not more than seven carbon atoms and a piperidyl compound containing replaceable hydrogen attached to the nuclear nitrogen atom.

10. A process of preparing tertiary piperidines which comprises reacting at a temperature between approximately 175° and approximately 250° C., in the liquid phase and in the presence of a nickel catalyst, a saturated aliphatic alcohol and a piperidyl compound containing replaceable hydrogen attached to the nuclear nitrogen atom.

11. A process of preparing tertiary heterocyclic amines which comprises reacting at a temperature between approximately 175° and approximately 250° C., in the liquid phase and in the presence of a reduced nickel catalyst, an aliphatic alcohol containing not more than seven carbon atoms and piperidine.

12. A process of preparing heterocylic amines which comprises reacting in the liquid phase, an alcohol and a heterocyclic compound containing only nitrogen as the heterocyclic atom, a replaceable hydrogen atom being attached to a hetero nitrogen atom, at a temperature between approximately 175° and approximately 250° C. in the presence of a reduced nickel catalyst prepared by levigating a foraminous carrier having associated therewith a soluble nickel salt, adding to the levigate a basic carbonate and reducing the resulting precipitated nickel carbonate.

13. A process of preparing heterocyclic amines which comprises reacting in the liquid phase and under superatmospheric pressure, an aliphatic alcohol containing not more than seven carbon atoms and a piperidyl compound containing replaceable hydrogen attached to the hetero nitrogen atom at a temperature between approximately 175° and approximately 250° C. in the presence of a reduced nickel catalyst prepared by levigating a foraminous carrier having associated therewith a soluble nickel salt, adding to the levigate a basic carbonate and reducing the resulting precipitated nickel carbonate.

14. A process of preparing heterocyclic amines which comprises reacting in the liquid phase and under superatmospheric pressure, an aliphatic alcohol containing not more than seven carbon atoms and a piperidyl compound containing replaceable hydrogen attached to the hetero nitrogen atom at a temperature between approximately 175° and approximately 250° C. in the presence of a reduced nickel catalyst prepared by levigating a mixture of approximately equal quantities of acid washed kieselguhr and nickel nitrate dissolved in water, adding to the levigate an aqueous solution of sodium bicarbonate and treating the resulting precipitated nickel carbonate with a stream of hydrogen for at least 60 minutes at a temperature of 425–475° C.

15. A process of preparing tertiary heterocyclic amines which comprises reacting at a temperature between approximately 175° C. and approximately 250° C., in the liquid phase and in the presence of a metal catalyst selected from the group consisting of copper, cobalt and nickel, a heterocyclic compound containing nitrogen as the heterocyclic atom, a replaceable hydrogen atom being attached to a nuclear nitrogen atom, and a compound of the formula R—OH, wherein R is a radical selected from the group consisting of the aliphatic radicals including the phenalkyls, the aryl radicals of the naphthalene and alkyl benzene series, the hydrogenated aryl radicals of the benzene and naphthalene series, and the furfuryl and hydrogenated furfuryl radicals.

16. A process of preparing heterocyclic amines which comprises reacting in the liquid phase, under superatmospheric pressure, at a temperature between approximately 175° C. and approximately 250° C., and in the presence of a nickel catalyst, a heterocyclic compound containing only nitrogen as the hetreocyclic atom, a replaceable hydrogen atom being attached to a heteronitrogen atom, and a compound of the formula R—OH, wherein R is a radical selected from the group consisting of the aliphatic radicals including the phenalkyls, the aryl radicals of the naphthalene and alkyl benzene series, the hydrogenated aryl radicals of the benzene and naphthalene series and the furfuryl and hydrogenated furfuryl radicals.

17. The process which comprises reacting at a temperature between approximately 175° C. and approximately 250° C., in the liquid phase and in the presence of a catalyst selected from the group consisting of copper, cobalt and nickel, an alcohol and a compound of the formula R'=NH, wherein R' is a cycloaliphatic chain having not more than five nor less than four carbon atoms and with N forms a heterocyclic group.

18. The process which comprises reacting at a temperature between approximately 175° C. and approximately 250° C., in the liquid phase and in the presence of a catalyst selected from the group consisting of copper, cobalt and nickel, a compound of the formula R'=NH, wherein R' is a cycloaliphatic chain having not more than five nor less than four carbon atoms and with N forms a heterocyclic group, with a compound of the formula R—OH, wherein R is a radical selected from the group consisting of the aliphatic radicals including the phenalkyls, the aryl radicals of the naphthalene and alkyl benzene series, the hydrogenated aryl radicals of the benzene and naphalene series, and the furfuryl and hydrogenated furfuryl radicals.

19. A process of preparing tertiary heterocyclic amines which comprises reacting at a temperature between approximately 175° C. and approximately 250° C., in the liquid phase and in the presence of a catalyst selected from the group consisting of copper, cobalt and nickel, a heterocyclic compound containing only nitrogen as the heterocyclic atom, a replaceable hydrogen atom being attached to a nuclear nitrogen atom, with a compound of the formula R—OH, wherein R is a radical selected from the group consisting of the aliphatic radicals including the phenalkyls, the aryl radicals of the naphthalene and alkyl benzene series, the hydrogenated aryl radicals of the benzene and naphthalene series, and the furfuryl and hydrogenated furfuryl radicals.

20. N-n-butyl alpha methyl piperidine.

21. A process of preparing tertiary heterocyclic amines which comprises reacting at a temperature between approximately 175° C. and approximately 250° C., in the liquid phase and in the presence of a catalyst selected from the group consisting of copper, cobalt and nickel, an alcohol and a hetrocyclic compound containing only nitrogen as the heterocyclic atom, a replaceable hydrogen atom being attached to a nuclear nitrogen atom.

22. A process of preparing tertiary heterocyclic amines which comprises reacting at a temperature between approximately 175° and approximately 250° C., in the liquid phase and in the presence of a nickel catalyst, an alcohol and a heterocyclic compound containing only nitrogen as the heterocyclic atom, a replaceable hydrogen atom being attached to a nuclear nitrogen atom.

23. A process of preparing tertiary heterocyclic amines which comprises condensing water from H attached to the heteronitrogen atom of a heterocyclic group and OH attached to a carbon atom of a substantially neutral organic hydroxy compound, said condensation reaction being carried out at a temperature between approximately 175° C. and approximately 250° C., in the liquid phase and in the presence of a catalyst selected from the group consisting of copper, cobalt and nickel catalysts.

HOMER ADKINS.
HOWARD I. CRAMER.